United States Patent [19]
Sugiura et al.

[11] Patent Number: 5,747,130
[45] Date of Patent: May 5, 1998

[54] INTERMEDIATE PRODUCT CAPABLE OF BEING FORMED INTO A BIAXIALLY ORIENTED POLYETHYLENE TEREPHTHALATE RESIN BOTTLE-SHAPED CONTAINER AND METHOD OF BLOW-MOLDING THE SAME

[75] Inventors: Horoaki Sugiura, Koto-ku; Fuminori Tanaka, Matsudo; Daisuke Uesugi, Koto-ku, all of Japan

[73] Assignee: Yoshino Kogyosho Co., Ltd., Tokyo, Japan

[21] Appl. No.: 683,431

[22] Filed: Jul. 18, 1996

Related U.S. Application Data

[62] Division of Ser. No. 327,893, Oct. 24, 1994, Pat. No. 5,562,960, which is a continuation of Ser. No. 76,099, Jun. 14, 1993, abandoned, which is a continuation of Ser. No. 866,099, Apr. 6, 1992, Pat. No. 5,248,533, which is a continuation of Ser. No. 588,491, Sep. 6, 1990, abandoned, which is a continuation of Ser. No. 171,101, Mar. 21, 1988, abandoned, which is a division of Ser. No. 897,035, Aug. 15, 1986, abandoned, which is a continuation-in-part of Ser. No. 701,352, Feb. 13, 1985, abandoned.

[30] Foreign Application Priority Data

Feb. 15, 1984 [JP] Japan ................. 59-26802

[51] Int. Cl.$^6$ ................. B29C 49/18; B29C 49/08; B29D 22/00
[52] U.S. Cl. ................. 428/36.92; 428/35.7; 428/542.8; 428/910; 264/527; 264/530; 264/532; 264/906; 264/908; 264/909
[58] Field of Search ................. 428/35.7, 35.1, 428/36.8, 36.92, 910, 542.8; 264/521, 523, 529, 530, 235, 519, 520, 532, 535, 906, 909, 908

[56] References Cited

U.S. PATENT DOCUMENTS

| | | |
|---|---|---|
| 3,767,747 | 10/1973 | Uhlig . |
| 3,888,961 | 6/1975 | Schonewald . |
| 3,892,829 | 7/1975 | Uhlig . |
| 3,970,419 | 7/1976 | Valyi . |
| 4,039,641 | 8/1977 | Collins . |
| 4,070,428 | 1/1978 | Krall et al. . |
| 4,108,937 | 8/1978 | Martineu et al. . |
| 4,144,298 | 3/1979 | Lee . |
| 4,233,022 | 11/1980 | Brady et al. . |
| 4,318,882 | 3/1982 | Agrawal et al. . |
| 4,379,099 | 4/1983 | Ota et al. . |
| 4,385,089 | 5/1983 | Bonnebat et al. . |
| 4,387,815 | 6/1983 | Jacobsen . |
| 4,496,517 | 1/1985 | Kinoshita et al. . |
| 4,522,799 | 6/1985 | Jabarin . |
| 4,564,495 | 1/1986 | Nilsson et al. . |
| 4,584,158 | 4/1986 | Nilsson et al. . |
| 4,604,307 | 8/1986 | Spreeuwers . |
| 4,697,718 | 10/1987 | Butcher . |
| 4,836,971 | 6/1989 | Denis et al. . |

FOREIGN PATENT DOCUMENTS

| | | |
|---|---|---|
| 56-105935 | 8/1981 | Japan . |
| 57-53326 | 3/1982 | Japan . |
| 57-187226 | 11/1982 | Japan . |
| 58-81131 | 5/1983 | Japan . |
| 59-001225 | 1/1984 | Japan . |
| 2 117 697 | 10/1983 | United Kingdom . |

*Primary Examiner*—Catherine Timm
*Attorney, Agent, or Firm*—Oliff & Berridge, PLC

[57] ABSTRACT

A biaxially oriented polyethylene terephthalate resin bottle-shaped container, and method of blow-molding the same, is disclosed. The method comprises the steps of heating the body portion of a preform at 90° to 130° C., biaxial-orientation blow-molding the preform in a primary blowing mold heated at 110° to 230° C. to form a primary intermediate molded bottle-shaped piece, heating the primary intermediate molded bottle-shaped piece at 130° to 255° C. or at a temperature which is at least 20° C. greater than the primary blowing mold temperature to form a secondary intermediate molded bottle-shaped piece, and blow-molding the secondary intermediate molded bottle-shaped piece in a secondary blowing mold heated at 100° to 150° C. to form a bottle-shaped container. The temperature of the secondary blowing mold is several degrees greater than the maximum temperature the molded bottle-shaped container will be subjected to during use. The bottle-shaped container of the present invention has no stress remaining from biaxial orientation blow-molding and has a high heat resistance temperature value.

33 Claims, 2 Drawing Sheets

INTERMEDIATE PRODUCT CAPABLE OF BEING FORMED INTO A BIAXIALLY ORIENTED POLYETHYLENE TEREPHTHALATE RESIN BOTTLE-SHAPED CONTAINER AND METHOD OF BLOW-MOLDING THE SAME

This application is a divisional of application Ser. No. 08/327,893 filed Oct. 24, 1994, now U.S. Pat. No. 5,562, 960, which is a continuation of application Ser. No. 08/076, 095 filed Jun. 14, 1993, now abandoned, which is a continuation of application Ser. No. 07/866,099 filed Apr. 6, 1992, now U.S. Pat. No. 5,248,533, which is a continuation of application Ser. No. 07/588,491 filed Sep. 6, 1990, now abandoned, which in turn is a continuation of application Ser. No. 07/171,101 filed Mar. 21, 1988, now abandoned, which is a divisional of application Ser. No. 06/897,035 filed Aug. 15, 1986, now abandoned, which in turn is a continuation-in-part of Ser. No. 06/701,352 filed Feb. 13, 1985, now abandoned.

BACKGROUND OF THE INVENTION

The present invention relates to a method of blow-molding a biaxially-oriented polyethylene terephthalate resin bottle-shaped container, and the biaxially-oriented polyethylene terephthalate resin bottle-shaped container made according to said method.

Polyethylene terephthalate resin (hereinafter referred to as "PET") has stable physical properties, excellent transparency and high mechanical strength. Also, PET causes no pollution when incinerated. PET is widely used in the production of biaxially-oriented blow-molded bottle-shaped containers, and is particularly useful for bottling foodstuffs.

PET bottle-shaped containers have a number of excellent properties as described above, however, blow-molded bottle-shaped containers of biaxially-oriented PET which are not heat treated suffer remarkable deformation at temperatures of 70° C. or more. Therefore, such PET bottle-shaped containers cannot be used to bottle retort food, which is heat treated by allowing the food to stand for 30 min. at 120° C., or other heat treated food. Accordingly, there is great demand for PET bottle-shaped containers which have high heat resistance.

There are several conventional methods of imparting heat resistance to PET bottle-shaped containers such as (1) heating a blowing mold during blow-molding of a PET bottle-shaped container to a temperature higher than the target heat resistance temperature value to increase the density of the PET bottle-shaped container; (2) heat setting a PET bottle-shaped container after blow-molding to remove residual strain produced by blow-molding; and (3) blow-molding an intermediate molded piece by first molding a primary blow-molded container, then reheating it at approximately 110° C., and finally blowing it again to produce a bottle-shaped container.

In method (1), the moldability of the PET decreases as the mold temperature rises. According to this method, the PET is heat resistant up to a maximum of approximately 100° C. This PET cannot be used for bottle-shaped containers containing food which is heat treated at temperatures much higher than 100° C. Methods (2) and (3) of imparting heat resistance to a PET bottle-shaped container cannot expect to produce a heat resistance higher than that of method (1).

SUMMARY OF THE INVENTION

Accordingly, it is an object of the present invention to provide a biaxially-oriented PET bottle-shaped container, and a method of blow-molding the same, which can eliminate the afore-mentioned drawbacks and disadvantages of the conventional methods.

It is another object of the present invention to provide a biaxially-oriented PET bottle-shaped container having very high heat resistance, and a method of blow-molding the same. This object is accomplished by a method in which a preform is biaxial-orientation blow-molded to form a primary intermediate molded piece, the primary intermediate molded piece is heat treated to thermally contract and deform the piece to form a secondary intermediate molded piece and then the secondary intermediate molded piece is blow-molded to form a final bottle-shaped container.

The foregoing objects and other objects, as well as the characteristic features of the invention will become more fully apparent and more readily understandable from the following description and the appended claims when read in conjunction with the accompanying drawings.

DESCRIPTION OF THE PREFERRED EMBODIMENTS

An embodiment of the present invention will now be described in detail with reference to the accompanying drawings.

Figure 1:
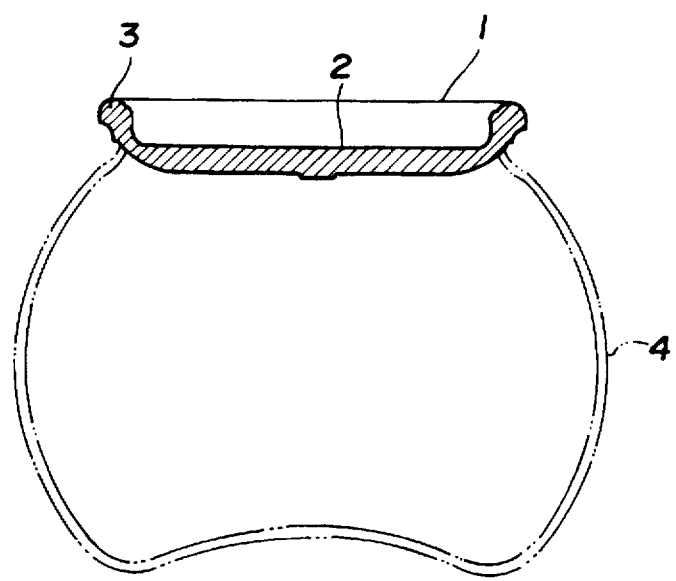
FIG. 1 is a longitudinal sectional view depicting the primary blow-molding state of a primary intermediate molded piece according to the present invention.

With reference to FIG. 1, the method of blow-molding the biaxially-oriented PET bottle-shaped container according to the present invention comprises the steps of: heating the body portion 2 of a preform 1, which is formed in a desired shape in advance, at 90° C. to 130° C. (preferably 100° C. to 120° C.) until the temperature approaches but does not reach the thermal crystallization temperature of the PET, biaxial-orientation blow-molding the preform in a primary blowing mold heated at 110° C. to 230° C. (preferably 140° C. to 230° C.) to form a primary intermediate molded bottle-shaped piece 4, heating the primary intermediate molded bottle-shaped piece 4 at 130° C. to 255° C. (preferably 170° C. to 255° C. or more preferably 200° C. to 235° C.) which is in a range that does not exceed the temperature immediately before the melting point at 255° C. of polyethylene terephthalate, or at a temperature which is at least 20° C. greater than the primary blowing mold temperature to form a secondary intermediate molded bottle-shaped piece 5 (FIG. 2), and blow-molding the secondary intermediate molded bottle-shaped piece 5 in a secondary blowing mold heated at 100° C. to 150° C. (preferably 120° C. to 150° C.), which is higher than the sterilizing temperature of the contents filled in the molded bottle-shaped container, to form a final bottle-shaped container 6.

More particularly, the method of blow-molding the biaxially-oriented PET bottle-shaped container of the present invention includes a first step of injection molding, in advance, a preform 1 in a desired shaped, a second step of thermally crystallizing, without orienting deformation, a neck portion of the bottle-shaped container 6 which remains in the same shape as at the injection molding time, and a third step of blow-molding the body of the bottle-shaped container 6.

The preform 1 is injection molded by ordinary injection molding techniques. In the exemplified embodiment, the injection molded preform 1 is formed in a dish shape as shown by solid lines in FIG. 1. The preform 1 has a neck portion 3 and a body portion 2. The body portion 2 becomes the body, including a bottom, of the biaxially-oriented blow-molded bottle-shaped container 6.

The body 2 is orientation magnified 5 to 13 times so that the orienting density may become 1.36 or more and so that the body 2 is not thermally crystallized even with a primary blowing mold temperature of 110° C. to 230° C. at the blow-molding time.

Thus, the body 2 is formed in the primary intermediate molded piece 4 without thermal crystallization even at the primary blowing mold temperature of 110° C. to 230° C. which is higher than the crystallizing temperature of the PET.

The peripheral end of a connecting portion between the body portion 2 and the neck portion 3 and the central portion of the body portion are hardly oriented as compared with other parts of the body portion 2 and are also readily crystallized. These portions are therefore preferably reduced in thickness relative to the other parts of the body portion 2 so as to be readily oriented.

The neck portion 3 of the preform 1 is, preferably, thermally crystallized or whitened prior to biaxial-orientation blow-molding the preform to form the primary intermediate molded bottle-shaped piece 4. The whitening of the neck portion 3 may be performed by sufficiently heating the neck portion 3 to crystallize the PET, followed by gradual cooling. It should be noted, however, that all deformation of the neck portion 3 should be avoided when whitening the neck portion 3. Particularly, deterioration of the degree of the circularity of the neck portion 3 should be avoided since such deformation would largely reduce the function of the final blow-molded bottle-shaped container 6.

After the neck portion 3 of the preform 1 is whitened in this manner, the preform 1 is blow-molded to form the bottle-shaped container 6. The blow-molding step involves biaxial-orientation blow-molding the preform 1 to form a primary intermediate molded bottle-shaped piece 4, heating the primary intermediate molded bottle-shaped piece 4 to thermally shrink it and form a secondary intermediate molded bottle-shaped piece 5, and blow-molding the secondary intermediate molded bottle-shaped piece 5 to form a final bottle-shaped container 6.

The step of biaxial-orientation blow-molding the preform 1 to form the primary intermediate molded bottle-shaped piece 4 is performed by first heating the body portion 2 of the preform 1 at 90° C. to 130° C. (preferably 100° C. to 120° C.) until the temperature approaches but does not reach the thermal crystallization temperature of the PET.

Next, the preform 1 is blow-molded in a blowing mold heated at 110° C. to 230° C. to form the primary intermediate bottle-shaped piece 4. The primary intermediate molded bottle-shaped piece 4 is oriented so that the area magnification of the preform 1 to the primary intermediate molded bottle-shaped piece 4 is in a range of 5 to 13 times and so that the density of the resin becomes 1.36 or more to prevent the bottle-shaped piece 4 from being thermally crystallized by the heating temperature of the primary mold and the heating temperature of the secondary intermediate molded piece.

The primary intermediate molded bottle-shaped piece 4 is then heated to thermally shrink it to form the secondary intermediate molded bottle-shaped piece 5. This shrinking step is performed to permit thermal deformation by eliminating residual stress developed in the blow-molded piece 4 from biaxial-orientation blow-molding. The orientation blow-molded portion of the primary intermediate molded bottle-shaped piece 4 is deformed by the internal residual stress by heating the primary intermediate molded bottle-shaped piece 4 in a furnace at 130° C. to 255° C. or a temperature which is at least 20° C. greater than the primary blowing mold temperature, (preferably 170° C. to 255° C. or more preferably 200° C. to 235° C.), to eliminate the residual stress. The deformation produced by the elimination of the internal residual stress acts to contract or shrink the orientation-molded portion of the primary intermediate molded bottle-shaped piece 4. Consequently, the orientation-molded portion of the secondary intermediate molded bottle-shaped piece 5 is molded by this contraction deformation.

Figure 2:
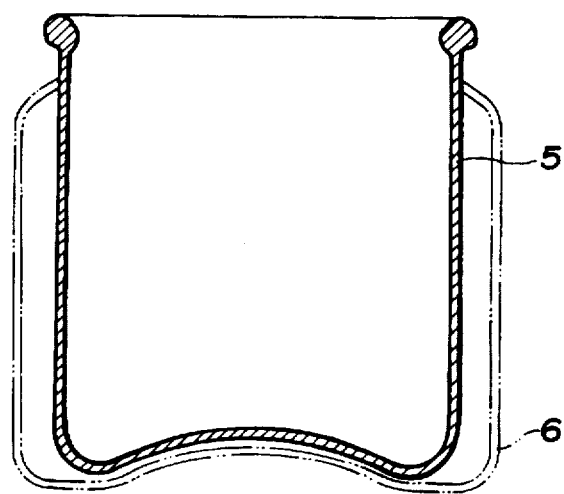
FIG. 2 is a longitudinal sectional view showing the secondary blow-molding state of a secondary intermediate molded piece according to the present invention.

The body portion of the secondary intermediate molded bottle-shaped piece 5 formed by the shrinkage deformation is predetermined in the orienting magnification from the preform 1 to the primary intermediate molded piece 4 and from the size of the primary intermediate molded piece 4 to be substantially equal to or slightly smaller than the orientation-molded body portion of the final bottle-shaped container 6 as shown in FIG. 2.

Finally, the secondary intermediate molded bottle-shaped piece 5 is blow-molded to form the final bottle-shaped container 6. The secondary intermediate molded bottle-shaped piece 5 is thermally shrunk by heating at 130° C. to 255° C. or at a temperature which is at least 20° C. greater than the primary blowing mold temperature (preferably 170° C.–255° C. or more preferably, 200° C.–235° C.) as described above, and is placed in the secondary blowing mold which is heated at a temperature of 100° C. to 150° C. (preferably 120° C. to 150° C.). The temperature of the secondary blowing mold is several degrees greater than the maximum temperature the molded bottle-shaped container 6 will be subjected to during use.

The body shape of the blow-molded portion of the secondary intermediate molded bottle-shaped piece 5 is substantially equal to or slightly smaller than the corresponding body shape of the bottle-shaped container 6 as described above. Accordingly, the orientation magnification from the secondary intermediate molded bottle-shaped piece 5 to the final bottle-shaped container 6 is quite small, and consequently almost no stress is created when the bottle-shaped container 6 molded from the secondary intermediate molded bottle-shaped piece 5 is orientation-molded.

Further, since the bottle-shaped container 6 is blow-molded by a secondary blowing mold heated at a temperature greater than the temperature the bottle-shaped container will be subjected to during use, the bottle-shaped container 6 is heatset by the secondary blowing mold, and therefore the bottle-shaped container 6 has no residual stress as well as high heat resistance.

Figure 3:
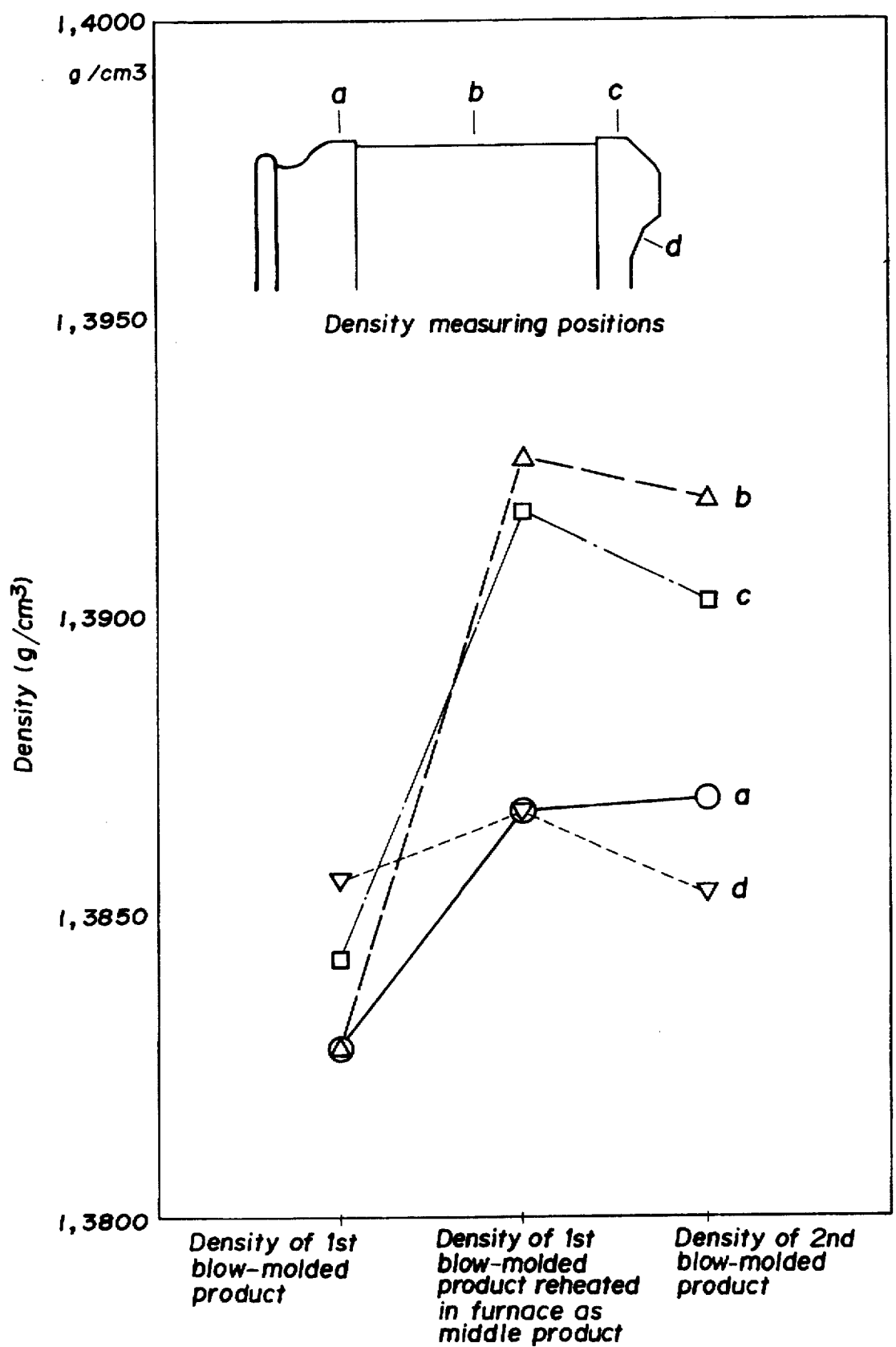
FIG. 3 is a graphic diagram showing the relationship between the density and the blow-molding temperature of the blow-molded bottle-shaped container of the present invention.

FIG. 3 shows the relationship between the density of the molding material at the respective molding steps and the mold temperatures.

A specific example of the method of blow-molding the biaxially-oriented PET bottle-shaped container of the present invention will now be described.

A preform 1 was biaxial-orientation blow-molded to form a primary intermediate molded bottle-shaped piece 4. The preform was heated to a temperature of 115° C. and was blow-molded at a primary blowing mold temperature of 180° C. under a blowing pressure of 25 kg/cm² for a blowing time of 1.4 sec. The primary intermediate molded bottle-shaped piece 4 was then heated and thermally shrunk to form a secondary intermediate molded bottle-shaped piece 5 at a heating temperature of 225° C. The secondary intermediate molded bottle-shaped piece 5 was blow-molded at a secondary blowing mold temperature of 140° C. under a blowing pressure of 30 kg/cm² for a blowing time of 4.4 sec. to form the final blow-molded bottle-shaped container 6.

The heat resistance of the blow-molded bottle-shaped container 6 was then tested by immersing it without a cap for 30 minutes in a tank of glycerin heated at 120° C. The bottle-shaped container 6 was then removed from the glycerin and water-cooled. The volumetric variation of the container before heating and after heating was measured. The volumetric rate of change of the bottle-shaped container 6 was found to be 0.33%. From this result, it is apparent that a PET bottle-shaped container having sufficiently high heat resistance can be provided by the present invention.

According to the method of the present invention as described above, the method of blow-molding the PET bottle-shaped container provides the blow-molded bottle-shaped container of the present invention which has no residual stress and extremely high heat resistance. The heat resistance temperature value is remarkably increased when compared with that of a conventional container.

While the present invention has been described in detail and with reference to specific examples thereof, it will be apparent to one skilled in the art that various changes and modifications can be made without departing from the spirit and scope thereof.

What is claimed is:

1. An intermediate product created during a process of blow-molding polyethylene terephthalate resin into a bottle-shaped container, comprising a biaxial-orientated, blow-molded, thermally contracted intermediate molded bottle-shaped product having essentially no residual stress and capable of being formed into a bottle-shaped container by subsequent blow-molding that is resistant to deformation caused by contents heated up to 70°–120° C., wherein the process includes a step of primary blow-molding a preform heated to a blow-molding temperature to produce a primary biaxial-orientated blow-molded bottle-shaped article and thermal contraction comprises heating said primary biaxial-orientated blow-molded bottle-shaped article to a temperature between about 130° C. to about 255° C. while allowing said primary article to shrink, said heating continuing for a period of time sufficient to remove essentially all residual stress.

2. The intermediate product of claim 1, wherein primary blowing of the preform includes heating the preform in a mold.

3. The intermediate product of claim 1, wherein the preform is blow-molded in a mold having walls heated to about 110°–230° C.

4. An intermediate product created during a process of blow-molding polyethylene terephthalate resin into a bottle-shaped container, comprising a biaxial-orientated, blow-molded, thermally contracted intermediate molded bottle-shaped product having essentially no residual stress and capable of being formed into a bottle-shaped container by subsequent blow-molding that is resistant to deformation caused by contents heated up to 70°–120° C., said intermediate product being formed by a process comprising:

providing a preform with a neck and a body;

biaxial-orientation blow-molding the preform at a biaxial orientation temperature to biaxially stretch the preform to form a primary intermediate molded bottle-shaped piece, the primary intermediate molded bottle-shaped piece having a residual stress created by the biaxial stretching; and essentially eliminating said residual stress caused by the blow-molding and creating high heat resistance by thermally contracting the primary intermediate molded bottle-shaped piece, wherein thermal contraction comprises heating the primary intermediate molded bottle-shaped piece to a temperature between about 130° C. to about 255° C. while allowing said primary piece to shrink, said heating continuing for a period of time sufficient to remove essentially all residual stress to form a secondary intermediate molded bottle-shaped piece that is said intermediate product.

5. The intermediate product of claim 4, wherein the preform is blow-molded in a mold.

6. The intermediate product of claim 5, wherein the mold includes walls heated to about 110°–230° C.

7. An intermediate biaxial-orientated blow-molded product having essentially no residual stress and capable of being formed into a bottle-shaped container by subsequent blow-molding that is resistant to deformation caused by contents heated up to 70°–120° C., said intermediate product formed by a process comprising:

a) forming a preform having a preliminary shape including a neck and a body;

b) biaxial-orientation blow-molding the preform in a mold to form a primary intermediate molded bottle-shaped piece, wherein the primary intermediate molded bottle-shaped piece has an area magnification from the preform in the range of 5–13 times and a density of 1.36 gm/cc or more, by:

(i) heating the body of the preform to a temperature that approaches but does not reach a thermal crystallization temperature of polyethylene terephthalate resin, and (ii) blow-molding the preform in a blow-mold heated to a temperature in the range of 110° C. to 230° C. to form a primary intermediate molded bottle-shaped piece; and c) causing thermal contraction of the primary intermediate molded bottle-shaped piece to form a secondary intermediate molded bottle-shaped piece to essentially eliminate residual stress in the primary intermediate molded bottle-shaped piece resulting from the step of blow-molding and creating high heat resistance, said thermal contraction including heating the primary intermediate molded bottle-shaped piece to a temperature of at least about 20° C. greater than the temperature of the mold of the blow-molding step.

8. An intermediate product created during a process of blow-molding polyethylene terephthalate resin into a bottle-shaped container, comprising a biaxial-orientated, blow-molded, thermally contracted intermediate molded bottle-shaped product having essentially no residual stress and capable of being formed by subsequent blow-molding into a bottle-shaped container that is resistant to deformation caused by contents heated up to about 70°–120° C., wherein the process includes a step of primary blow-molding a preform heated to a blow-molding temperature to produce a primary biaxial-orientated blow-molded bottle-shaped piece and thermal contraction comprises heating said primary biaxial-orientated blow-molded bottle-shaped piece to a temperature between about 130° C. to about 255° C. while allowing said primary piece to shrink, said heating continuing for a period of time sufficient to remove essentially all residual stress.

9. The intermediate product of claim 8, wherein the preform is blow-molded in a mold.

10. The intermediate product of claim 9, wherein the mold includes walls heated to about 110°–230° C.

11. A secondary intermediate product created from a primary biaxial-orientated blow-molded bottle-shaped piece formed during a process of blow-molding polyethylene terephthalate resin into a bottle-shaped container, said secondary intermediate product having essentially no residual stress and capable of being formed by subsequent blow-molding into a bottle-shaped container that is resistant to deformation caused by contents heated up to about 70°–120° C., wherein the process includes a step of primary blow-molding a preform heated to a blow-molding temperature to produce the primary biaxial-orientated blow-molded bottle-shaped piece and thermal contraction comprises heating said primary biaxial-orientated blow-molded bottle-shaped piece to a temperature between about 130° C. to about 255° C. while allowing said primary piece to shrink, said heating continuing for a period of time sufficient to remove essentially all residual stress.

12. The secondary intermediate product of claim 11, wherein the preform is blow-molded in a mold.

13. The secondary intermediate product of claim 12, wherein the mold includes walls heated to about 110°–230° C.

14. A method for making a biaxially orientated, blow-molded intermediate product having substantially no residual stress, said intermediate product capable of being further blow-molded into a biaxially orientated polyethylene terephthalate resin bottle-shaped container, the method comprising:

providing a preform with a neck and a body;

biaxial-orientation blow-molding the preform at a biaxial orientation temperature to biaxially stretch the preform to form a primary intermediate molded bottle-shaped piece, the primary intermediate molded bottle-shaped piece having a residual stress created by the biaxial stretching; and essentially eliminating said residual stress caused by the blow-molding and creating high heat resistance by thermally contracting the primary intermediate molded bottle-shaped piece, wherein thermal contraction comprises heating the primary bottle-shaped piece to a temperature between about 130° C. to about 255° C. while allowing said primary piece to shrink, said heating continuing for a period of time sufficient to remove essentially all residual stress to form a secondary intermediate molded bottle-shaped piece that is said intermediate product.

15. The method of claim 14, wherein said providing the preform includes forming the preform.

16. The method of claim 14, wherein said providing the preform includes thermally crystallizing the neck of the preform.

17. The method of claim 14, wherein said step of biaxial-orientation blow-molding the preform includes biaxially stretching the preform to result in the primary intermediate molded bottle-shaped piece with an area magnification of 5 to 13 times the preform.

18. The method of claim 14, wherein said step of biaxial-orientation blow-molding the preform includes biaxially stretching the preform to result in the primary intermediate molded bottle-shaped piece having a density of 1.36 gm/cc or more.

19. The method of claim 14, wherein said step of biaxial-orientation blow-molding the preform includes heating the body of the preform at a temperature in the range of 90° C. to 130° C. and blow-molding the heated preform in a blowing mold heated to a temperature in the range of 110° C. to 230° C.

20. The method of claim 19, wherein said step of heating the body of the preform includes heating the preform at a temperature in the range of 100° C. to 120° C.

21. The method of claim 14, wherein said thermal contraction temperature is in the range of 170° C. to 255° C.

22. The method of claim 14, wherein said thermal contraction temperature is in the range of 200° C. to 235° C.

23. The method of claim 14, wherein the step of biaxial-orientation blow-molding the preform is performed in a mold.

24. The method of claim 23, wherein the mold is heated to between about 110°–230° C.

25. A method for forming an intermediate product having substantially no residual stress, said intermediate product capable of being blow-molded into a biaxially orientated polyethylene terephthalate resin bottle-shaped container resistant to deformation by heated contents, the method comprising:

a) forming a preform having a preliminary shape including a neck and a body;

b) biaxial-orientation blow-molding the preform to form a primary intermediate molded bottle-shaped piece, wherein the primary intermediate molded bottle-shaped piece has an area magnification from the preform in the range of 5–13 times and a density of 1.36 gm/cc or more, by:

(i) heating the body of the preform to a biaxial orientation temperature that approaches but does not reach a thermal crystallization temperature of polyethylene terephthalate resin, and (ii) blow-molding the preform heated to the biaxial orientation temperature to form a primary intermediate molded bottle-shaped piece; and c) causing thermal contraction of the primary intermediate molded bottle-shaped piece to form a secondary intermediate molded bottle-shaped piece to essentially eliminate residual stress in the primary intermediate molded bottle-shaped piece resulting from the step of blow-molding and creating high heat resistance, wherein said thermal contraction comprises heating the primary intermediate molded bottle-shaped piece to a temperature between about 130° to about 255° C. while allowing said primary piece to shrink, said heating continuing for a period of time sufficient to remove essentially all residual stress.

26. The method of claim 25, wherein said step of forming a preform includes heating the preform to a temperature in a range of 100° C. to 120° C.

27. The method of claim 25, wherein said step of biaxial-orientation blow-molding the preform to form a primary intermediate molded bottle-shaped piece includes blow-molding the preform in a blow-mold heated to a temperature in the range of 110° C. to 230° C.

28. The method of claim 25, wherein the thermal contraction temperature is in the range of 170° C. to 255° C.

29. The method of claim 25, wherein the thermal contraction temperature is in the range of 200° C. to 235° C.

30. The method of claim 25, including the step of thermally crystallizing the neck of the preform.

31. The method of claim 25, wherein the step of biaxial-orientation blow-molding the preform is performed in a mold.

32. The method of claim 31, wherein the mold is heated to between about 110°–230° C.

33. The method of claim 27, wherein the temperature of the blow-mold is in the range of 140°–230° C.

* * * * *